No. 829,196. PATENTED AUG. 21, 1906.
P. EBELING.
APPARATUS FOR REHEATING GLASS.
APPLICATION FILED MAR. 11, 1905.
5 SHEETS—SHEET 1.
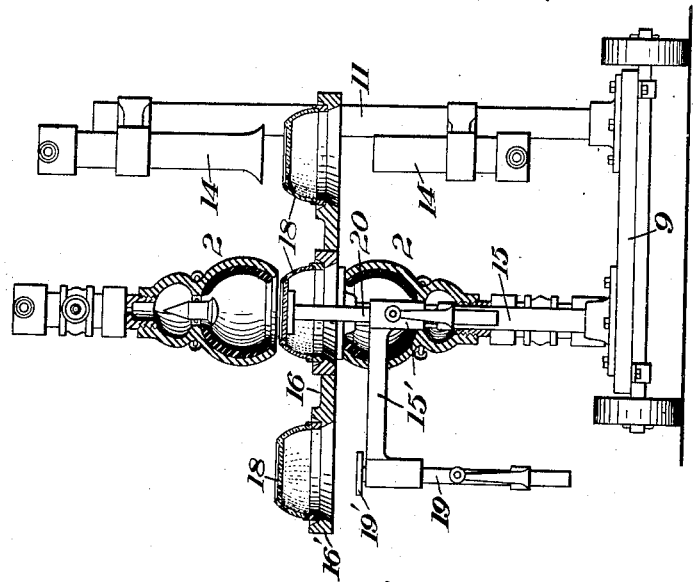
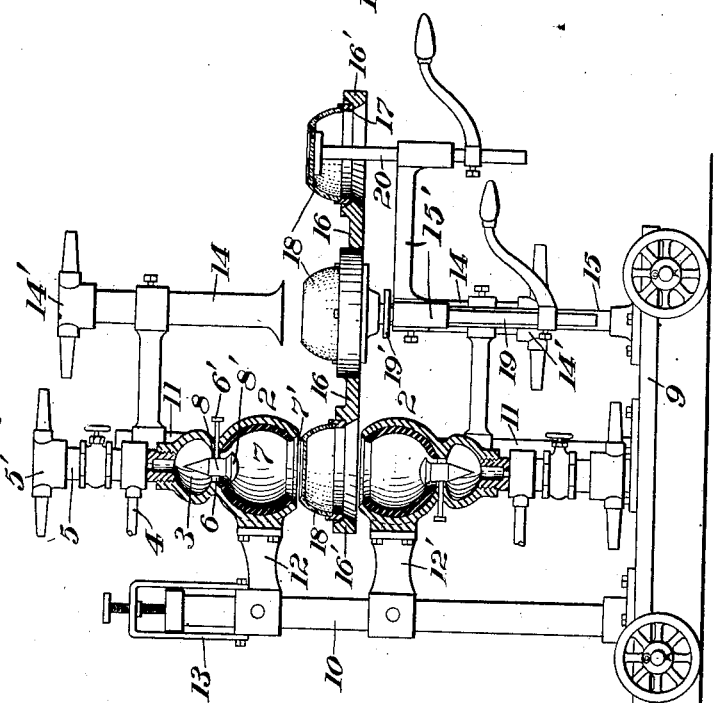
Witnesses:
Inventor,
Philip Ebeling,
By Jno. Nesbit,
Att'y.

No. 829,196. PATENTED AUG. 21, 1906.
P. EBELING.
APPARATUS FOR REHEATING GLASS.
APPLICATION FILED MAR. 11, 1905.
5 SHEETS—SHEET 2.
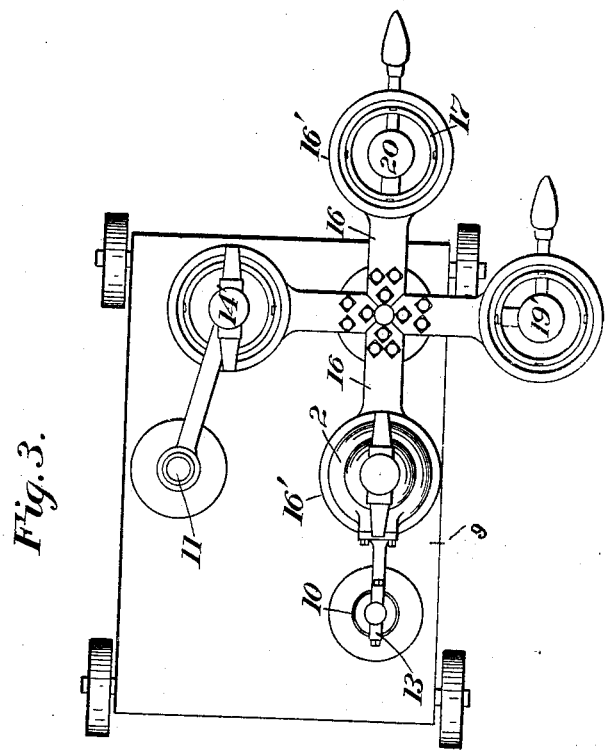
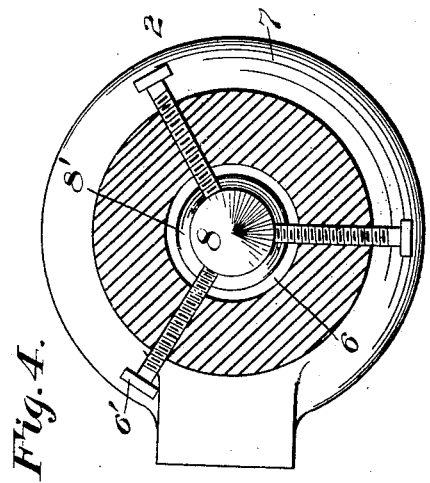
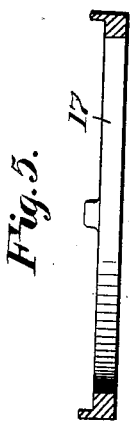
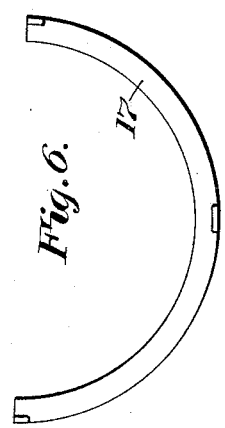
Witnesses:
Inventor;
Phillip Ebeling
By
Atty.

No. 829,196. PATENTED AUG. 21, 1906.
P. EBELING.
APPARATUS FOR REHEATING GLASS.
APPLICATION FILED MAR. 11, 1905.

5 SHEETS—SHEET 3.

Witnesses;
Inventor;

No. 829,196. PATENTED AUG. 21, 1906.
P. EBELING.
APPARATUS FOR REHEATING GLASS.
APPLICATION FILED MAR. 11, 1905.

5 SHEETS—SHEET 4.

Witnesses;
Inventor;
Att'y.

No. 829,196. PATENTED AUG. 21, 1906.
P. EBELING.
APPARATUS FOR REHEATING GLASS.
APPLICATION FILED MAR. 11, 1905.
5 SHEETS—SHEET 5.
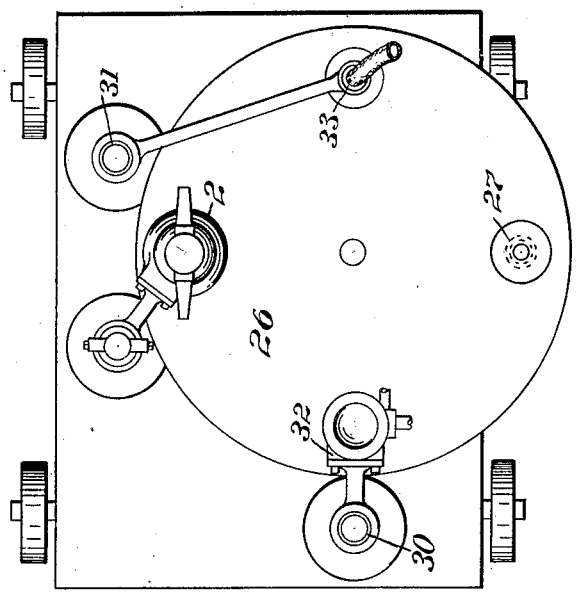
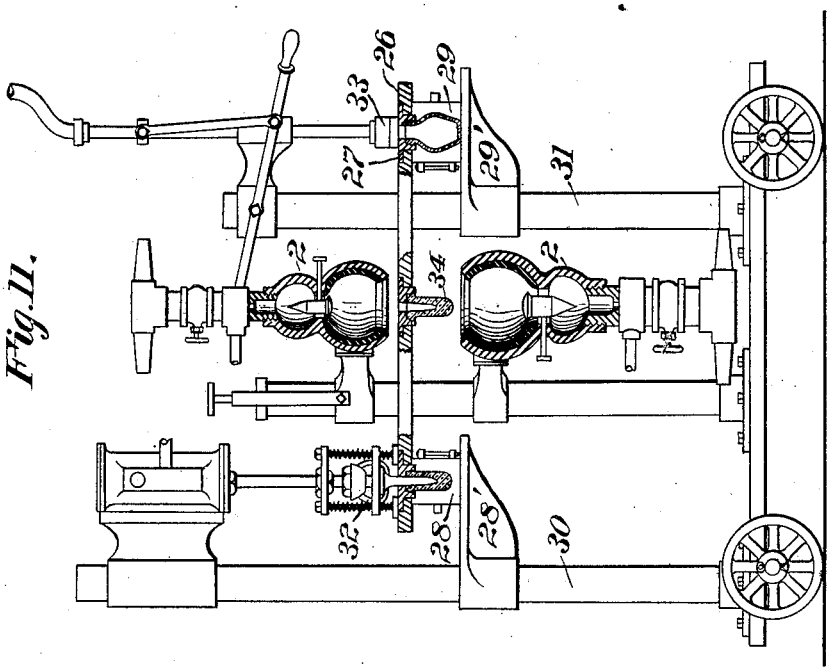
Witnesses:
Inventor;
Phillip Ebeling

UNITED STATES PATENT OFFICE.

PHILLIP EBELING, OF MOUNDSVILLE, WEST VIRGINIA.

APPARATUS FOR REHEATING GLASS.

No. 829,196.     Specification of Letters Patent.     Patented Aug. 21, 1906.

Application filed March 11, 1905. Serial No. 249,540.

*To all whom it may concern:*

Be it known that I, PHILLIP EBELING, a citizen of the United States, residing at Moundsville, in the county of Marshall and State of West Virginia, have invented certain new and useful Improvements in Apparatus for Reheating Glass, of which the following is a specification, reference being had therein to the accompanying drawings.

This invention relates to apparatus for reheating glass; and it consists, primarily, in a novel assemblage of coöperating glass-heating burners which are so arranged as to thoroughly reheat the glass without injury thereto.

The invention may be utilized for fire-finishing and glazing glassware, in which use the burners coöperate in such manner that the shape of the article is preserved during the reheating operation without being rotated, as has been necessary heretofore. The reheating apparatus may be variously utilized in addition to fire-finishing, one of such uses being the reheating of pressed blanks between the operations of pressing and blowing, as in those methods of manufacture wherein the glass is first pressed to form a blank and then completed by blowing.

A further object is to provide a reheating-burner of novel construction.

Still a further object is to provide improved means for cooling the reheated glass in such operations as fire-finishing where cooling is necessary.

Figure 7:
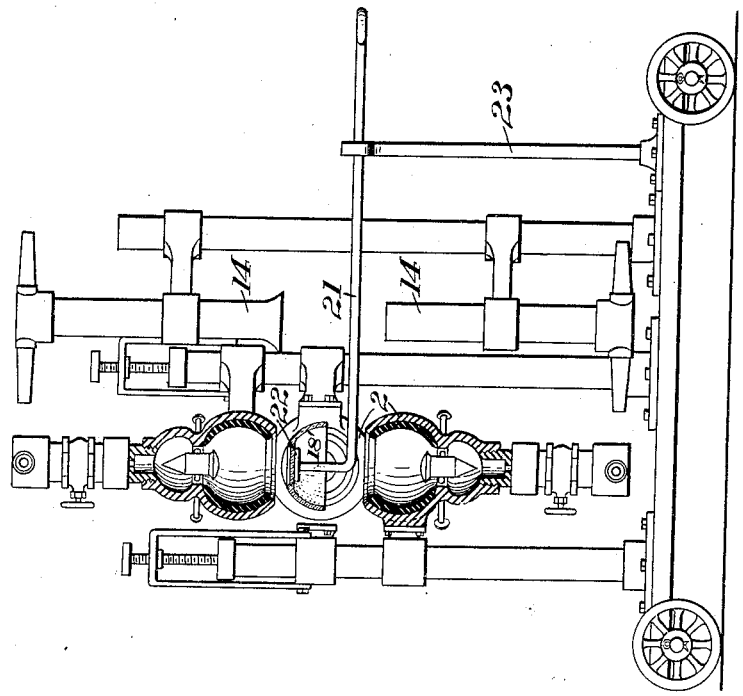
Figure 8:
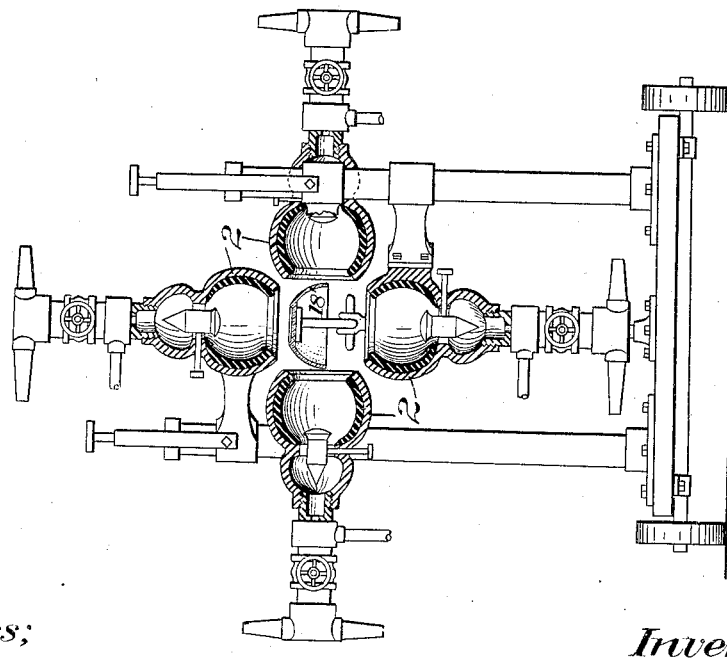
Figure 10:
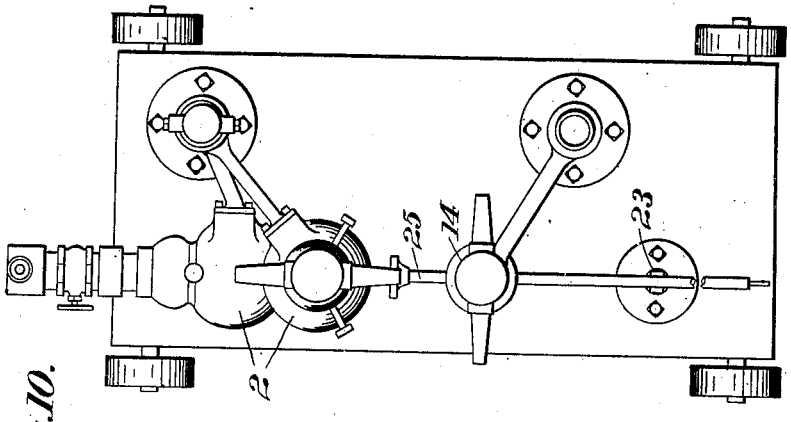
Figure 9:
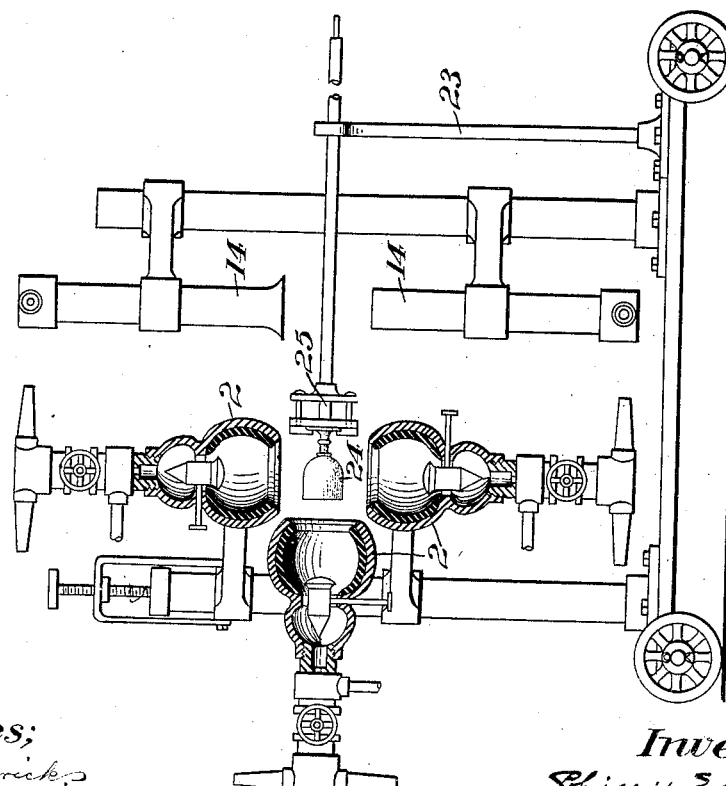

In the accompanying drawings, Figure 1 is a side elevation, partly in section, of apparatus for fire-finishing blanks for cut glass. Fig. 2 is a front elevation, partly in section, and Fig. 3 a top plan view, of the same. Fig. 4 is an enlarged cross-sectional view of the burner. Figs. 5 and 6 are detail views of the blank-supporting ring. Fig. 7 is a side elevation, partly in section, of apparatus for fire-finishing pressed ware; and Fig. 8 is an end view, partly in section, of the same. Fig. 9 is a side elevation, partly in section, of apparatus designed especially for fire-finishing stemware; and Fig. 10 is a plan view of the same. Fig. 11 is a vertical section of apparatus, showing an adaptation of the invention for reheating pressed blanks preparatory to blowing; and Fig. 12 is a plan view of the same.

As reheating-burners 2 of like construction are employed in the several adaptations of the invention herein shown and described, I will first describe the burner in detail. Each burner consists, preferably, of a mixing-chamber 3, having its inlet provided with a gas connection 4 and an air connection 5, having a double hose-receiver 5'. Chamber 3 is connected by contracted orifice 6 with a combustion-chamber 7 of globular form for the purpose of thoroughly mixing and reflecting the ignited gases which are emitted from the burner-orifice 7' in a swirling manner, so as to completely envelop the portion of the article against which they are projected. Within chamber-connecting orifice 6 is a longitudinally-adjustable deflector 8 of plug-like form, held in place by screws 6' and operating to thoroughly mix the air and gas passing therearound and at the same time control the volume thereof entering the combustion-chamber by moving deflector-head 8' toward or from orifice 6. The breaking up and thorough mixing of the air and gas currents is facilitated by the tapered end of the plug projected toward the inlet of the mixing-chamber.

Referring to Figs. 1, 2, and 3, which illustrate a desirable embodiment of the invention for fire-finishing blanks for cut glass, 9 designates the machine-base, from which rise standards 10 and 11. One of burners 2, which opens downwardly, is secured to standard 10 by bracket 12, adjustably held by yoke-clamp 13. A second burner 2, beneath and in line with the first-mentioned burner and opening upwardly, is adjustably secured to standard 10 by bracket 12'. Adjustably secured to standard 11 are the alining downwardly and upwardly opening air-blast pipes 14, having their inlet ends provided with double hose connections 14'. A horizontal table rotatable on standard 15 is utilized for presenting the articles for fire-finishing, the table consisting of radially-arranged arms 16, each having at its outer end an open circular holder 16'. The table-axis is equidistant from the center lines of the burners and air-pipes, respectively, so that by turning the table a blank is carried from between the burners to position between the blast-pipes. Fitting the upper face of each holder 16' is a removable ring 17, and adapted to rest thereon on edge and in inverted position is the molded glass blank 18. Ring or holder 17 is removable, so that others of different size or shape may be used, according to the size or shape of the blank to be fire-finished. With the blank thus positioned the table is so turned as to place it between burners 2, where it remains until sufficiently heated to secure the desired fire finish or polish.

It has been proposed heretofore to fire-polish the interior of hollow glass articles by sustaining them in upright position and projecting a downwardly-directed flame thereinto, apparatus of this character being disclosed in patent to C. J. Nolan, No. 766,193, August 2, 1904. When operating such apparatus, it is necessary to rotate the article and to project cold air against its outer surface in order to counteract the distorting or flattening-out tendency of the softened glass. With the hollow article inverted and the reheating-flame projected upwardly thereinto, as herein proposed, there is no appreciable distorting tendency, this being due to the position in which the glass is held, and any such tendency that may exist is counteracted by the sustaining force or pressure of the upwardly-projected flame. The operation may be somewhat more effective with the opposing burners acting simultaneously, and, if so, it is because the flame from each burner counteracts the destructive tendency of the other; but however this may be I do not consider it of sufficient importance to make absolutely necessary the operation of both burners at the same time, although the work is greatly facilitated by such operation, as thereby the inner and outer surfaces are fire-finished simultaneously. Every portion of the blank is thoroughly reheated and fire-finished or polished, save the edge or edges upon which it rests; but as the latter are cut or reshaped in the subsequent operation of producing a cut-glass article the absence of fire-finish from the edges is no detriment. After the article is sufficiently reheated the table is turned so as to bring it between pipes 14, where it is subjected to opposing cooling-blasts, whereby all portions of the article are cooled uniformly and simultaneously. As the blanks are still hot from the forming operation when they are presented for fire-finishing, they may be conveniently positioned by means of a hand-lifted rod 19, having a plate-like head 19', upon which the inverted blank is hung and lowered onto ring 17 at the station adjacent burners 2. A similar lifting device 20 may be utilized for removing the fire-finished blanks at the station adjacent the cooling mechanism. Devices 19 and 20 may be conveniently supported by brackets 15', projecting from standard 15.

The apparatus shown in Figs. 7 and 8 is designed especially for fire-finishing pressed glass dishes and similar articles and is shown provided with four burners 2, so arranged as to project their flames toward a common point. Two of the burners are arranged and operate the same as in the construction of Figs. 1, 2, and 3, and two additional burners may be arranged horizontally at opposite sides, so that flames are projected against the article from above, below, and from the sides. It is necessary to thoroughly fire-finish the sides and edge or edges of pressed ware, and hence a holder is provided consisting of a hand-operated rod 21, having its upturned extremity provided with a plate-like head 22, upon which the article 18' is placed in inverted position, as shown. While this form of holder prevents the inner surface of the bottom from becoming thoroughly fire-finished, such deficiency is not objectionable in ware of this character. The sides and edges are freely suspended, and there is nothing to prevent them from becoming completely enveloped by the flames and thoroughly fire-finished. Supporting-rod 21 may be conveniently sustained upon a standard 23, which is placed a sufficient distance from the burners to admit of the opposite blast-pipes 14 being placed in such position with relation to the burners that as the reheated article is withdrawn from the latter it is brought to position between the blast-pipes and thoroughly cooled. In this embodiment of the invention the four burners may be used, as shown, or only some of them, and it is obvious that the cooling portion of the apparatus may be differently arranged and located.

The mechanism shown in Figs. 9 and 10 is arranged with special reference to fire-finishing stemmed ware, a goblet 24 being shown, although other articles of stem formation may be similarly treated. In this adaptation opposing upper and lower burners are utilized, and a third burner is positioned at one side, so as to discharge its flames between the vertical burners and toward the open end of the article for glazing the edge thereof and fire-finishing the interior. To prevent injuring the edge, this horizontal burner is preferably adjusted for a lower heat than the vertical burners. The goblet or other article may be supported by a snap 25 of usual construction, and blast-pipes 14 may be arranged in the same relation to the burners as in the construction of Figs. 7 and 8, so that the fire-finished article is positioned between said pipes as it is withdrawn from the burners.

In those methods of manufacture wherein the glass is first pressed to form a blank and then blown it is desirable to provide for reheating the same between the pressing and blowing operations. The principles underlying my invention may be readily utilized for this purpose, an adaptation thereof being shown in Figs. 11 and 12. Referring thereto, 26 designates a horizontally-rotating table which carries a series of mold or neck rings 27, which are adapted to coöperate successively with press-mold 28 and blow-mold 29, supported, respectively, on brackets 28' and 29', projecting from uprights 30 and 31. 32 designates plunger or pressing mechanism supported on upright 30, and 33 the blowing-head and attending mechanism supported by upright 31. The pressing and blowing mechanism are of usual construction, and no novelty is claimed therefor. As table 26 is turned for the purpose of transferring the pressed blank 34 from the press-mold to the blow-mold the blank is brought to position between the opposing vertical burners 2, arranged much as in the construction of Figs. 1, 2, and 3, the main difference being that the upper burner is preferably smaller than the lower burner, as less heat is required from above than from below. The interior and exterior surfaces of the blank, chilled by contact with the plunger and mold, are thus effectually reheated by the opposing burners, each of which counteracts any tendency of the other toward distorting the reheated and softened glass, and with the apparatus arranged as shown the reheating is accomplished as the blank is moved from the press-mold to the blow-mold and without removing it from the carrier.

While the several forms of apparatus herein shown and described contain burners so arranged as to project their flames against the articles to be heated or reheated, the invention is not limited in regard to the heating agency, and hence it will be understood that other and different forms of devices may be used for heating the articles without departing from the spirit and scope thereof.

I claim—

1. Apparatus for reheating hollow glass articles comprising a plurality of heating devices arranged with a space therebetween to receive the article, and a support arranged to so sustain an article between the heating devices that the inner and outer surfaces thereof are heated.

2. Apparatus for reheating hollow glass articles comprising a plurality of burners arranged to project their flames in different directions with a space between the burners to receive a glass article, and a support arranged to so sustain a hollow grass article between the burners that the entire inner and outer surfaces thereof are enveloped by the burner-flames.

3. Apparatus for reheating hollow glass articles comprising two burners arranged to project their flames in different directions, and a support arranged to so sustain a hollow glass article that the flame from one burner is projected against the interior surface of the article and the flame from the other burner against the exterior surface thereof.

4. Apparatus for reheating hollow glass articles comprising separated burners arranged, respectively, to project their flames downwardly and upwardly, and a support arranged to sustain a hollow article with its interior in line with one of the burners and its exterior in line with the other burner.

5. Apparatus for reheating hollow glass articles comprising a support adapted to sustain a hollow article with its concavity open from below, and means for projecting a flame upward directly into the concavity of the article.

6. Apparatus for reheating hollow glass articles comprising a support adapted to sustain a hollow article with its concavity open from below, means for projecting a flame upwardly into the concavity of the article, and means for heating the exterior of the article.

7. Apparatus for reheating glass articles comprising separated upwardly and downwardly disposed heating devices, an article-support movable horizontally between said devices with the upper and lower surfaces of the supported article exposed to said heating devices respectively.

8. Apparatus for reheating glass articles comprising vertically-separated heating devices, vertically-separated cooling devices, and an article-support movable horizontally between the heating and cooling devices with the upper and lower surfaces, respectively, of the supported article exposed successively to the heating and cooling devices.

9. The combination of glass-reheating means, and cooling means consisting of separated downwardly and upwardly discharging air-pipes with space therebetween for the reheated glass.

10. Glass-reheating apparatus comprising separated burners having space therebetween for a glass article, separated cooling-blast discharges, and movable supporting means for sustaining the glass between the burners and between the cooling-blast discharges and for moving the same from one of said positions to the other.

11. Glass-reheating apparatus comprising a vertically-open support upon which an inverted hollow article is adapted to rest on edge, and means for heating the interior of the article.

12. A fire-finishing machine comprising a traveling holder having an apertured bottom plate, and burners or furnaces above and below the holder.

In testimony whereof I affix my signature in presence of two witnesses.

PHILLIP EBELING.

Witnesses:
J. M. NESBIT,
VINNIE M. MYERS.